United States Patent [19]
Gray

[11] Patent Number: 5,323,511
[45] Date of Patent: Jun. 28, 1994

[54] HANDLE FOR A VEHICLE WINDOW

[76] Inventor: Ronald E. Gray, 720 Grandview Dr., Sequim, Wash. 98382

[21] Appl. No.: 938,602

[22] Filed: Sep. 1, 1992

[51] Int. Cl.⁵ .............................................. E05B 7/00
[52] U.S. Cl. ................................ 16/114 R; 16/110 R
[58] Field of Search ............ 16/114 R, 111 R, 110 R, 16/125, 127

[56] References Cited

U.S. PATENT DOCUMENTS

| | | | |
|---|---|---|---|
| 1,700,123 | 1/1929 | Doughty | 16/125 |
| 2,586,986 | 2/1952 | Orrison | 16/110 R |
| 2,722,137 | 11/1955 | Russell | 16/125 |
| 2,900,156 | 8/1959 | Styers | 16/114 R |
| 3,153,806 | 10/1964 | Jakeway | 16/127 |
| 4,021,072 | 5/1977 | Belanger | 296/71 |
| 4,023,827 | 5/1977 | Matalonis et al. | 280/756 |
| 4,072,339 | 2/1978 | Rothlisberger | 296/71 |
| 4,200,323 | 4/1980 | Cocksedge | 16/114 R |
| 4,356,592 | 11/1982 | Moore | 16/125 |
| 4,794,668 | 1/1989 | Lorence et al. | 16/125 |

Primary Examiner—Paula A. Bradley
Assistant Examiner—Chuck Y. Mah

[57] ABSTRACT

A handle apparatus is provided for mounting onto a roll-down type vehicle window. A hook of thin material and having a width of at least one inch extends over the top edge of the window. The inside surface of the hook forms a planar surface resting in contact with the inside surface of the window. A ring able to accommodate an adult hand extends in a generally downward direction and is attached to the hook. Alternatively, the ring is pivotably fixed to the hook, thereby allowing a variety of sizes of hands to use the device. The ring is preferably D-shaped or C-shaped. The hook material is thin enough to allow the window to close completely with the hook in place. The planar surface contacts the window, thereby holding the ring in a convenient position for a passenger's hand to hold and to grasp the grasping means. The hook is easily installed and removed from the window.

1 Claim, 3 Drawing Sheets

HANDLE FOR A VEHICLE WINDOW

FIELD OF THE INVENTION

This invention relates generally to handles, and, more particularly, to a handle for attachment to a vehicle window.

BACKGROUND OF THE INVENTION

Passengers in vehicles such as automobiles have long known that a handle or gripping element fixed near the top of the vehicle is extremely helpful for their own stabilization while the vehicle is in motion, particularly while the vehicle is turning. Accordingly, several manufactures have incorporated interior handles and straps into vehicles. Such handle devices are typically located at a fixed position within the interior of the automobile, and may include an auxiliary hook to hold, for example, clothes supported from a wire hanger.

Frequently, however, such handles are not conveniently or comfortably located for all sizes of passengers. Some passengers wishing to hold such a handle may find that it is located in an awkward position and unable to be moved easily, and that comfortable use of the handle is dependent upon the location setting of the passenger's seat. Moreover, a location that is well-suited for a handle being grasped by a passenger might not be well-suited for hanging of clothes or other articles. Further, many automobiles do not have such handles at all.

Clearly, then, there is a need for a handle device that can be easily attached to and removed from most vehicles. Such a needed device would be readily relocatable to suit the requirements at hand, such as finding the most comfortable position for the device, or such as hanging clothing or like articles. The needed device would be extremely easy to manufacture, making it relatively inexpensive. Moreover, the needed device would not interfere with the operation of the vehicle or cause any damage thereto. Such a needed device would be able to support both a passenger's hand and standard clothes hangers just as easily. The present invention fulfills these needs and provides further related advantages.

SUMMARY OF THE INVENTION

The present invention is a convenience handle device for mounting onto a roll-down type vehicle window. The window has a top edge, an inside surface, and an upper sash above the top edge. A handle mounting means, such as a hook of thin material and having a width of at least one inch, extends over the top edge of the window. The inside surface of the hook forms a planar surface resting in contact with the inside vertical surface of the window. A grasping means, such as a ring able to accommodate a passenger's hand, extends in a generally downward direction and is attached to the mounting means.

In operation, the handle mounting means is conveniently positioned and then clamped between the window and the vehicle by moving the window into a full upward position. The hook material is thin enough to allow the window to close completely, such that no wind noise is generated while driving the vehicle. The planar surface contacts the window, thereby holding the grasping means in a convenient position for a passenger's hand to grasp the grasping means. In an alternate embodiment of the invention, the ring is not rigidly fixed to the mounting means, thereby allowing a variety of sizes of hands to use the device.

The present invention provides passenger stabilization, and alternately can serve as a means by which to hang clothes or other articles during transport thereof. Moreover, the present invention is extremely easy to manufacture, install, and remove, making the handle inexpensive and convenient to use. The handle can be located at any point along the top surface of the window according to the passenger's preference; passengers with longer arms tend to prefer a more forward placement of the handle on the top surface of the window than do passengers with shorter arms. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
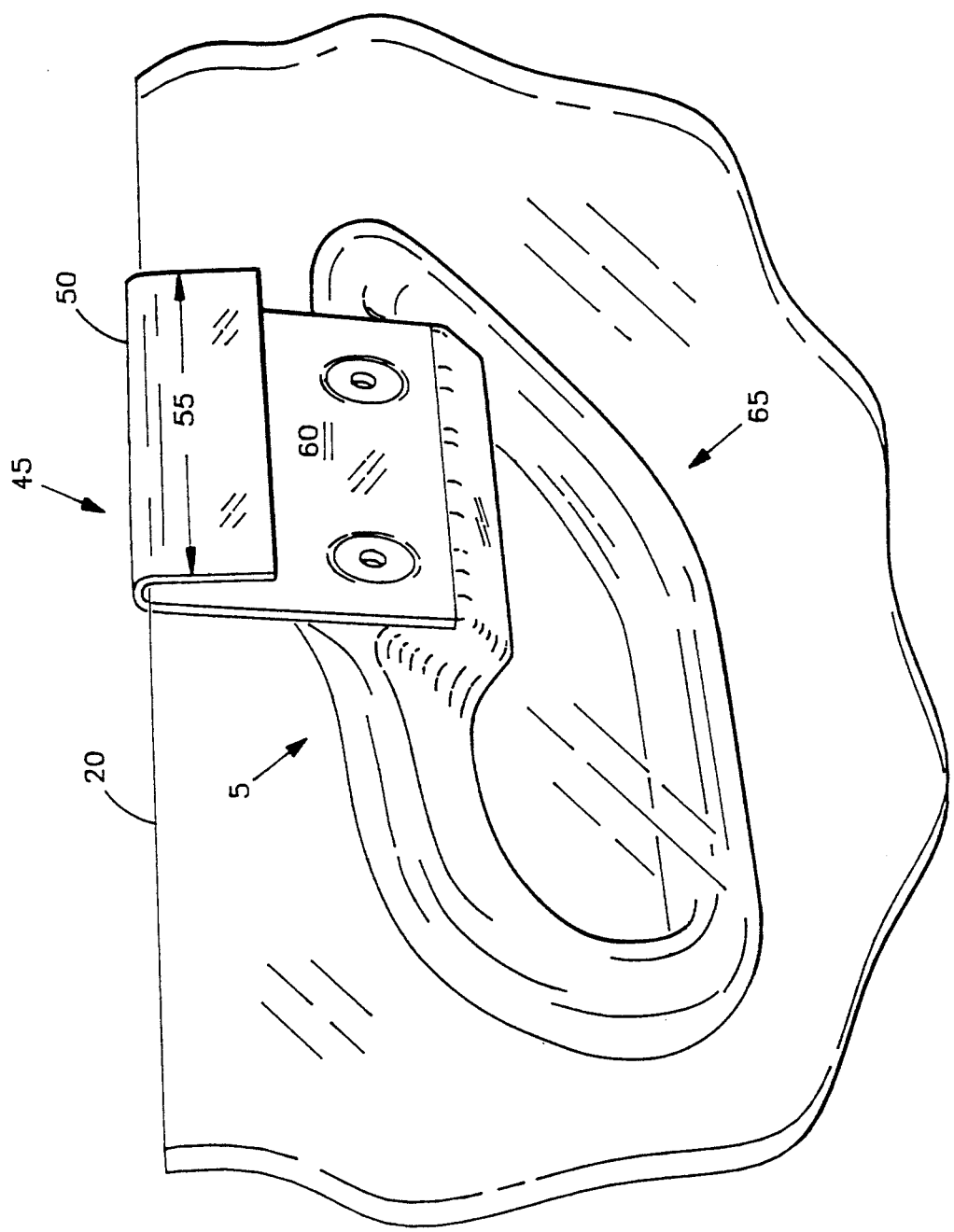
FIG. 1 is a perspective illustration of the invention, illustrating a handle of the invention attached to the top of a vehicle window.
Figure 3:
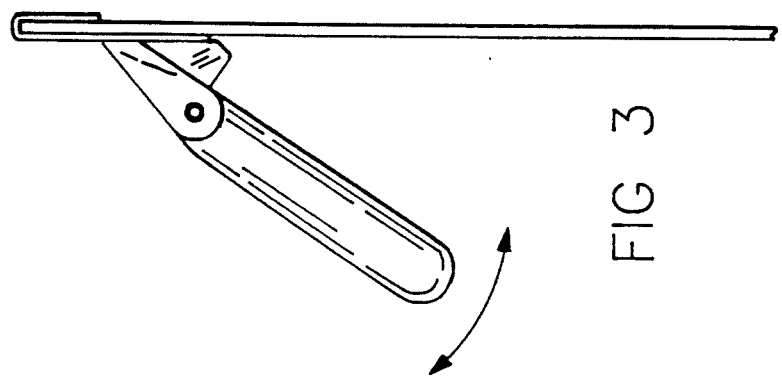
FIG. 3 is a left side elevational view of the invention, illustrating an embodiment thereof wherein the ring is not in a fixed position relative to a surface of the invention that contacts the window.
Figure 2:
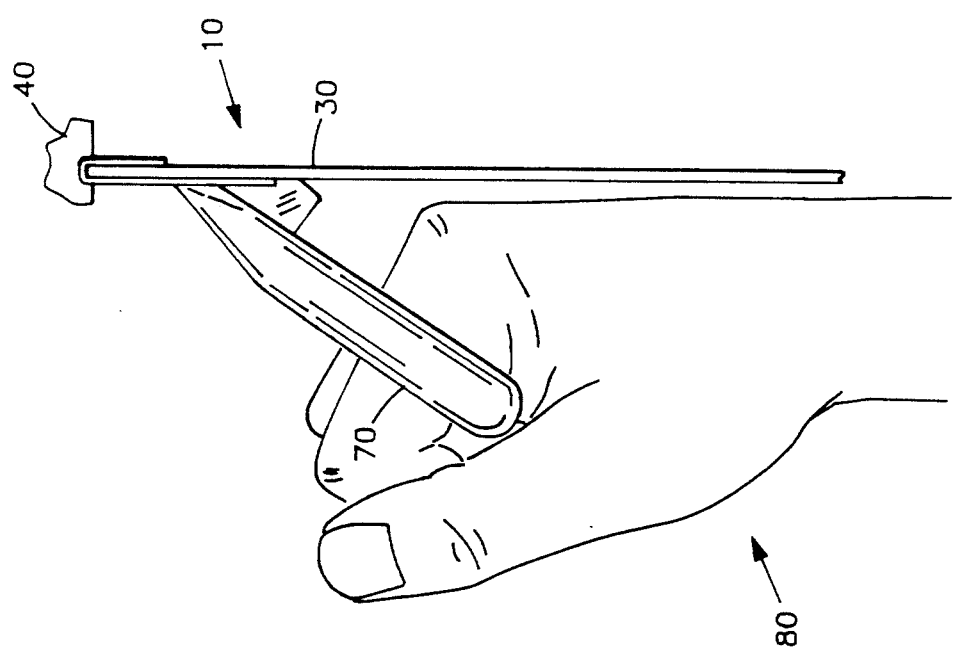
FIG. 2 is a left side elevational view of the invention, illustrating an adult hand grasping a ring of the invention.
Figure 4:
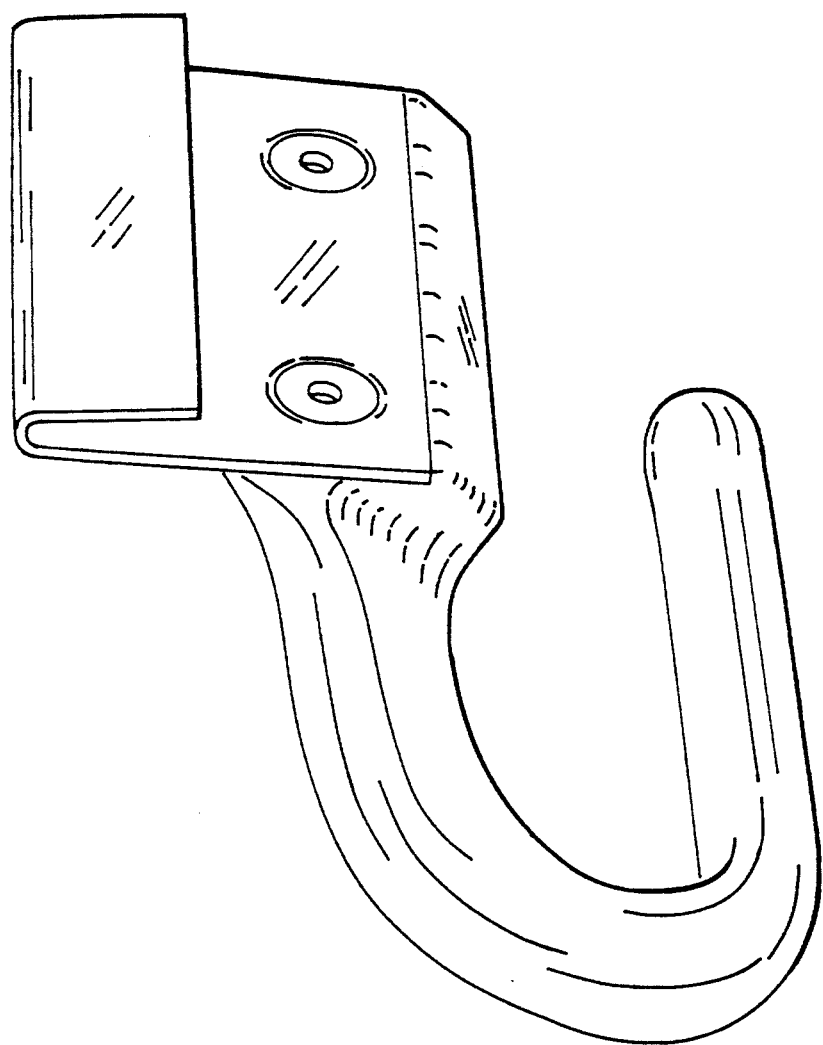
FIG. 4 is a perspection illustration of another embodiment of the invention showing a C-shaped grasping means.

FIG. 1 shows a convenience handle device 5 for mounting onto a roll-down type vehicle window 10. The window 10 has a top edge 20, an inside surface 30, and an upper sash 40 above the top edge 20 (FIG. 2). A handle mounting means 45, such as a C-shaped hook 50 that has a width 55 of at least one inch, is adapted for fitting tightly over the top edge 20 of the window 10. A planar surface 60 of the hook 50 contacts the inside surface 30 of the window 10. A grasping means 65, such as a ring 70 (FIG. 2), is able to accommodate an adult hand 80. The ring 70 extends in a generally downward direction, is attached to the hook 50. The plane of the ring 70 intersects the plane of the window 10 with approximately a 45° angle. In an alternate embodiment of the invention, the ring 70 is with at least one pivot pin 75 (FIG. 3), thereby allowing a variety of sizes of hands 80 to use the device 5. In the preferred embodiment of the invention, the straight portion of which is grasped by the passenger's hand alternatively, the ring 70 may be C-shaped (FIG. 4).

The device 5 may be manufactured as one piece in an injection molded process. Alternatively, a strong, polished metal may be used in a similar injection molding process. Clearly, any material strong enough to support a hand on a window will suffice. Alternatively, the ring 70 may be constructed of an elastomeric material such that the grasping means 65 is able to conform to the shape of the hand 80 for improved comfort.

In operation, the hook 50 is conveniently positioned and then clamped between the top edge 20 of the window 10 and the upper sash 40 with the window 10 in a full upward position. The hook 50 is made from a thin-wall material to allow the window 10 to close completely with the hook 50 in place (FIG. 2). The planar surface 60 contacts the inner surface 30 of the window 10, thereby holding the ring 70 in a convenient position for a passenger's hand 80 to grasp.

While the invention has been described with reference to a preferred embodiment, it is to be clearly understood by those skilled in the art that the invention is not limited thereto. For example, a thin sheet of elastomeric material may be attached to the planar surface 60 to prevent scratching of the window 10. Other minor additions could be included with the invention without changing the spirit and scope thereof. Thus, the scope of the invention is to be interpreted only in conjunction with the appended claims.

I claim:

1. A convenience handle device for a roll-down window, the window having a top edge, an inside surface and an upper sash above the top edge, the device comprising:

a handle mounting means for attaching the handle to the window, the mounting means including a C-shaped portion adapted for tightly fitting over the top edge of the window, and of such thin construction as to allow full closure of the window into the upper sash, and including a planar surface adapted for contacting the inside surface of the window for distributing forces on the handle to the window;

a means for grasping, pivotally fixed to the handle mounting means by at least one pivot pin, the grasping means thereby being adapted for moving in an arc while extending in a generally downward direction from the mounting means;

such that the mounting means is clamped between the top edge and the upper sash, the planar surface resting in contact with the inside surface of the window, supporting the grasping means in a convenient position for a passenger's hand to hold and to grasp the grasping means, whereby the handle device is easily placed and removed form the window and easily fixed at a convenient location along the top edge of the window.

* * * * *